(12) United States Patent
Venugopal et al.

(10) Patent No.: US 10,142,126 B2
(45) Date of Patent: Nov. 27, 2018

(54) SCALABLE DYNAMIC OVERLAY TUNNEL MANAGEMENT

(71) Applicant: Cisco Technology, Inc., San Jose, CA (US)

(72) Inventors: Prashanth Venugopal, San Francisco, CA (US); Sarat Babu Kamisetty, Fremont, CA (US); Siva Gaggara, Sunnyvale, CA (US); Nikhil Gopinath Shetty, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 14/743,149

(22) Filed: Jun. 18, 2015

(65) Prior Publication Data

US 2016/0373341 A1    Dec. 22, 2016

(51) Int. Cl.
*H04L 12/46* (2006.01)
*H04L 29/08* (2006.01)

(52) U.S. Cl.
CPC .......... *H04L 12/4633* (2013.01); *H04L 67/00* (2013.01); *H04L 67/141* (2013.01); *H04L 67/16* (2013.01)

(58) Field of Classification Search
CPC .................................................. H04L 12/4633
See application file for complete search history.

(56) References Cited

U.S. PATENT DOCUMENTS

| | | | |
|---|---|---|---|
| 7,801,030 B1 * | 9/2010 | Aggarwal | H04L 12/44 370/227 |
| 8,074,270 B1 | 12/2011 | Lordello | |
| 8,346,961 B2 * | 1/2013 | Asati | H04L 29/12386 709/230 |
| 8,499,095 B1 * | 7/2013 | Sullenberger | H04L 12/4641 370/254 |
| 2002/0067731 A1 * | 6/2002 | Houston | H04L 12/4633 370/401 |
| 2005/0232286 A1 * | 10/2005 | Lee | H04L 45/12 370/401 |
| 2008/0037498 A1 * | 2/2008 | Narayanan | H04W 28/06 370/342 |
| 2012/0269134 A1 * | 10/2012 | Jin | H04W 28/085 370/328 |
| 2013/0124685 A1 | 5/2013 | Keitel et al. | |

(Continued)

OTHER PUBLICATIONS

Cisco, "Overlay Transport Virtualization, Using OTV to Extend Layer 2 between Two Data Centers Connected Through Dark Fiber Links," White Paper, Jan. 2015, 49 pages.

*Primary Examiner* — Jason E Mattis (74) *Attorney, Agent, or Firm* — Edell, Shapiro & Finnan, LLC (57) ABSTRACT

A first network device receives a first data packet from a registry device. The first data packet includes a destination of a first host coupled to the first network device and reachability information for a second host coupled to a second network device. The first network device stores the reachability information for the second host, which indicates that the second host is coupled to the second network device. The first network device transmits the first data packet without the reachability information to the first host. Using the reachability information for the second host, a tunnel is created from the first network device to the second network device.

20 Claims, 8 Drawing Sheets

(56) References Cited

U.S. PATENT DOCUMENTS

| | | | |
|---|---|---|---|
| 2015/0033321 A1* | 1/2015 | Yang | H04L 61/20 |
| | | | 726/12 |
| 2015/0085638 A1* | 3/2015 | Li | H04L 45/50 |
| | | | 370/217 |
| 2016/0182444 A1* | 6/2016 | Mao | H04L 12/4633 |
| | | | 370/392 |

* cited by examiner

SCALABLE DYNAMIC OVERLAY TUNNEL MANAGEMENT

TECHNICAL FIELD

The present disclosure relates to overlay tunnel management in computer networks.

BACKGROUND

Data centers typically establish tunnels as an overlay/transport mechanism between leaf nodes to provide transport for endpoint hosts. A tunnel is established between each pair of leaf nodes when each node is added. As the data center grows, tunnel management becomes increasingly difficult, since a full mesh of tunnels is maintained between larger numbers of leaf nodes.

DESCRIPTION OF EXAMPLE EMBODIMENTS

Overview

A first network device receives a first data packet from a registry device. The first data packet includes a destination of a first host coupled to the first network device and reachability information for a second host coupled to a second network device. The first network device stores the reachability information for the second host, which indicates that the second host is coupled to the second network device. The first network device transmits the first data packet without the reachability information to the first host. Using the reachability information for the second host, a tunnel is created from the first network device to the second network device.

Example Embodiments

In many cases, every server/host connected to leaf nodes in a data center network may not need to communicate with every other server/host behind every other leaf node. Using the techniques presented herein, server-to-server conversations are used to decide which leaf nodes need tunnels to be established. This reduces the number of tunnels to be managed in the network to tunnels that are actively being used by the servers.

A registry server ("registry") is established with reachability information for all of the servers/hosts in the data center. The registry also has an overlay-tunnel to every server/host in the data center network. When a source server/host needs to communicate with a destination server/host, the first data packet may be sent to the registry with the source server's reachability information in the packet. The registry forwards the packet to the destination server based on the reachability information that it has, along with the source's reachability information. The source's reachability information may be obtained from the registry or from the source server. On receiving the first packet with the reachability information of the source server, the destination server establishes a tunnel towards the source server for traffic in the reverse direction. When the first packet in the reverse direction is sent along the tunnel toward the source server, reachability information for the destination server is also included, and the source server may also establish a tunnel to the destination server.

Since most communications in a data center are two-way communications, this method of tunnel management is an efficient way to establish tunnels among a pair of conversant servers. If the communication is unidirectional, then traffic may still flow through the registry, but tunnel establishment may be skewed. Each tunnel may decide if it will establish a tunnel upon receiving a packet based on whether the conversation is likely to be unidirectional or bidirectional. For example, Transport Control Protocol (TCP) communications are always bidirectional, so if a destination server receives a TCP packet, the destination server may decide to establish a tunnel to the source server. In contrast, User Datagram Protocol (UDP) communications may be unidirectional, and a tunnel back to the source server may not be necessary. In one example, a flow table may be maintained to determine if a communication flow is bidirectional before triggering the establishment of a tunnel to the source.

Figure 1:
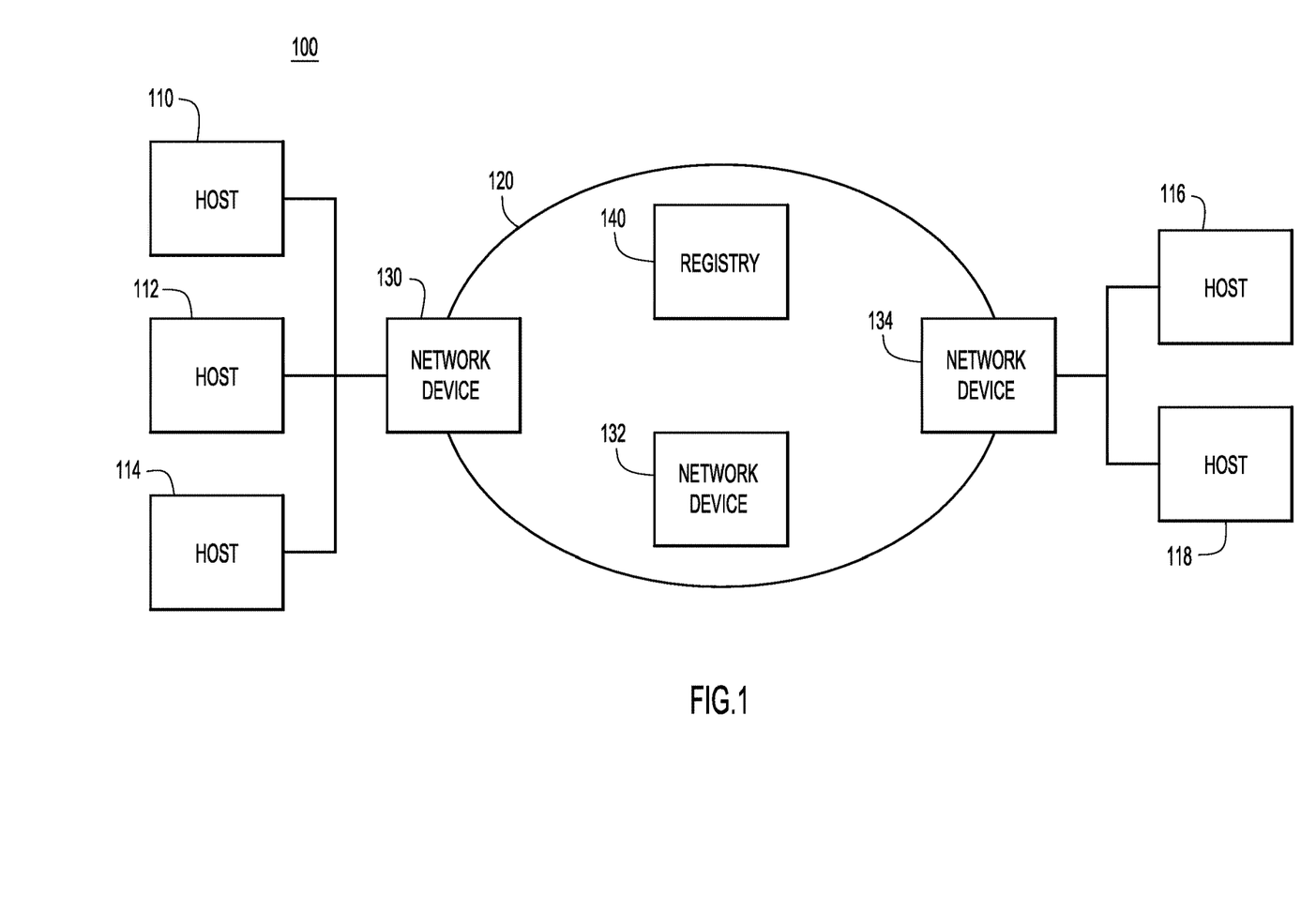
FIG. 1 is a system block diagram showing hosts coupled by network devices, according to an example embodiment.

Referring now to FIG. 1, a simplified block diagram of a data center system 100 is shown. System 100 includes a plurality of hosts/servers 110, 112, 114, 116, and 118, which communicate with each other through network 120. Network 120 includes individual network devices 130, 132, and 134. Hosts 110, 112, and 114 are coupled to network device 130, and hosts 116 and 118 are coupled to network device 134. A registry device 140 is accessible through the network 120. The registry device includes reachability/location information for all of the hosts in the data center 100.

In one example, the hosts 110, 112, 114, 116, and 118 may take a variety of forms, including a desktop computer, laptop computer, server, mobile/cellular phone, tablet computer, Internet telephone, etc. Network devices 130, 132, and 134 may be, for example, a switch or router in a variety of types of network (e.g., any combination of Internet, intranet, local area network (LAN), wide area network (WAN), wired network, wireless network, etc.) that connects computing devices, e.g., hosts 110, 112, 114, 116, and 118. In another example, network devices 130, 132, and 134 are Top-Of-Rack (TOR) switches that coordinate the communications of the servers/hosts in an electronics rack of the data center. Registry device 140 may be a server behind a network device that maintains data describing tunnels to and from every other network device to enable access for each host to the registry 140.

Figure 2:
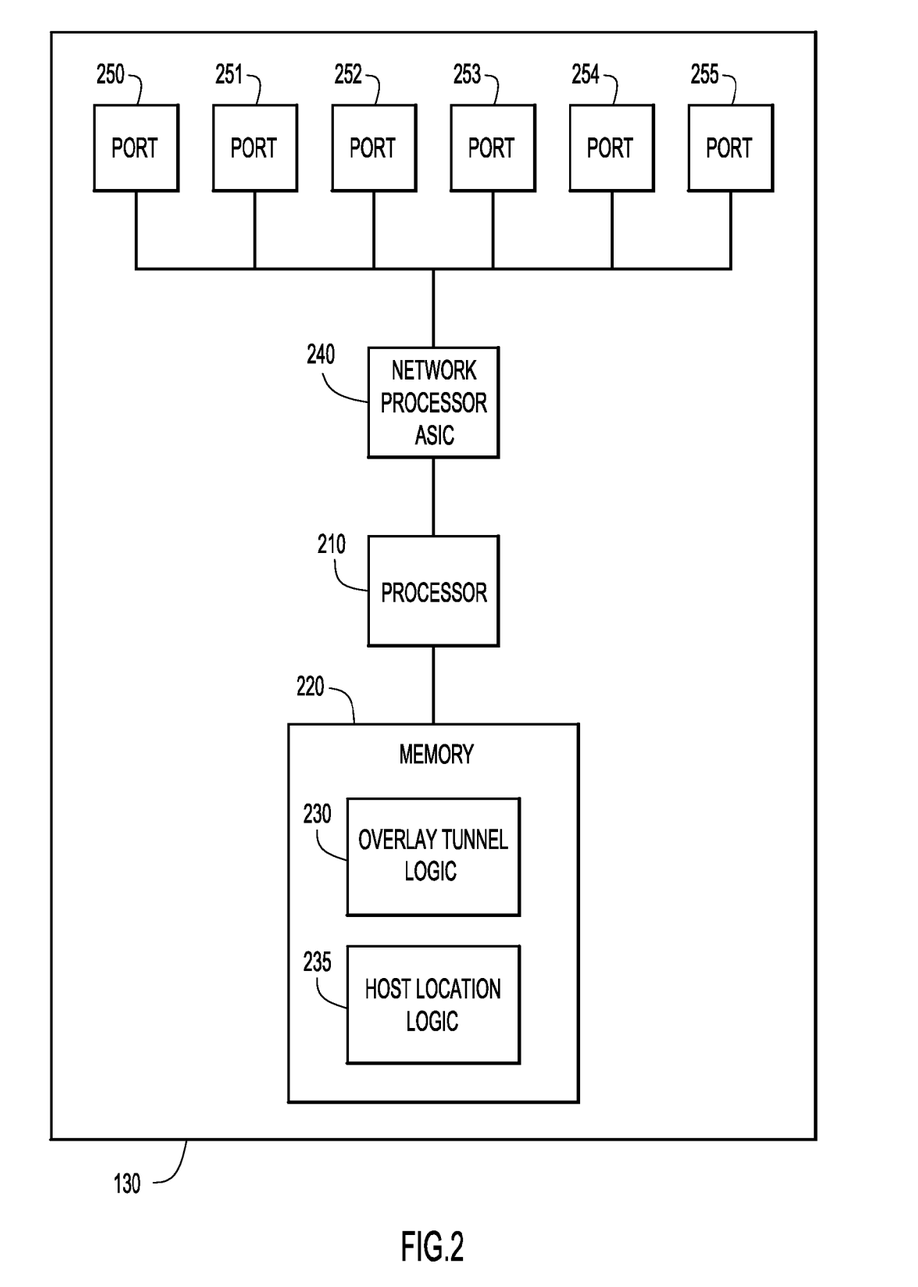
FIG. 2 is a simplified block diagram of a network device, according to an example embodiment.

Referring now to FIG. 2, a simplified block diagram of a network device 130 is shown. Network device 130 includes, among other possible components, a processor 210 to process instructions relevant to processing communication packets, and memory 220 to store a variety of data and software instructions (e.g., overlay tunnel logic 230, host location table 235, communication packets, etc.). The network device 130 also includes a network processor application specific integrated circuit (ASIC) 240 to process communication packets that flow through the network element 120. Network processor ASIC 240 processes communication packets to and from ports 250, 251, 252, 253, 254, and 255. While only six ports are shown in this example, any number of ports may be included in network element 120.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 3A:
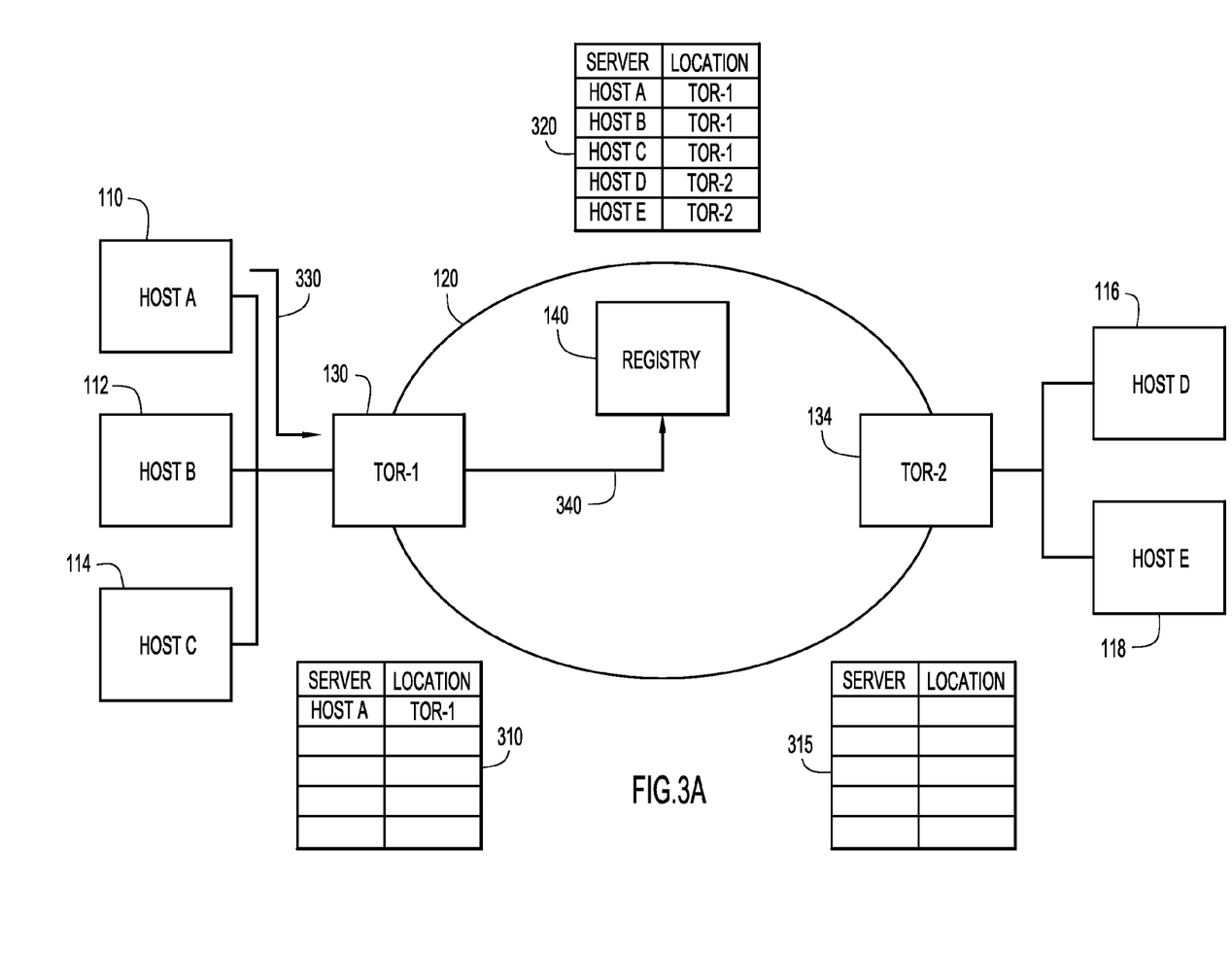
FIGS. 3A, 3B, and 3C are system diagrams showing the network devices setting up tunnels to facilitate host communications, according to an example embodiment.

Referring now to FIG. 3A, a system diagram shows the location tables for the network devices as a host initiates communication with a host at an unknown location. Network device 130 (e.g., TOR-1) includes a location table 310, and network device 134 (e.g., TOR-2) includes a location table 315. The registry 140 includes a location table 320 that stores locations for all of the hosts reachable through the network. In one example, the location table stores records that correlate hosts and the network device that each host is behind. In other words, the location of each host is recorded as the network device through which the host communicates with the rest of the network. To initiate a communication session with host 116, the host 110 sends the first packet 330 to the network device 130. Since the location table 310 of network device 130 does not contain a record for host 116, the network device sends the first packet to the registry 140 as message 340.

In one example, the network device 130 may store location information in table 310 for all of the hosts 110, 112, and 114 that are behind the network device 130. Alternatively, the network device 130 may only store location information for hosts that have sent or received packets.

Figure 3B:
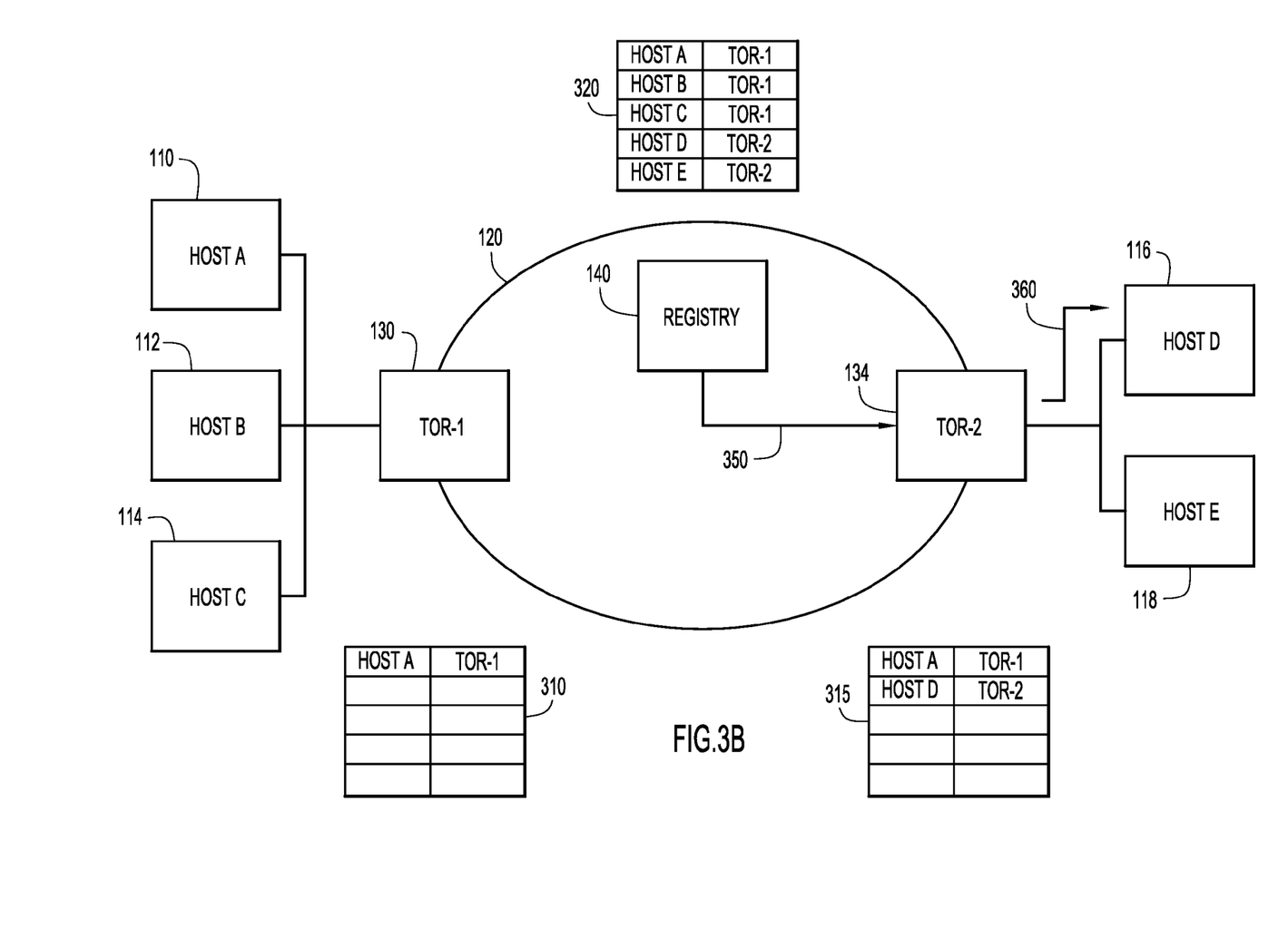

Referring now to FIG. 3B, a system diagram shows the location tables for the network devices as the registry forwards the initial data packet to the appropriate network device. Registry 140 looks up the location information for the destination host 116 of the packet that it received from host 110, and forwards the packet 350 to the appropriate network device 134. The registry 140 also includes location information for host 110, i.e., that host 110 is behind network device 130. The network device 134 stores the location information for host 110 in location table 315 and forwards the data packet 360 to the destination host 116.

In one example, the network device 134 may now create a tunnel to network device 130 on the assumption that the communication between hosts 110 and 116 will be bi-directional. The network device 134 uses the location information from message 350 to establish the tunnel from network device 134 to network device 130. Alternatively, the network device 134 may wait to set up a tunnel until the host 116 actually sends a packet toward host 110.

In another example, the network device 134 may determine whether to create the tunnel to network device 130 based on the protocol of the data packet. Transport Control Protocol (TCP) communications are inherently bidirectional, and the network device 134 may set up the tunnel to the network device 130 upon detecting the packet is a TCP packet. Alternatively, a User Datagram Protocol (UDP) packet may be part of a unidirectional communication, and the network device 134 may maintain a flow table to determine whether any packets are returned to the source host (i.e., the communication is bidirectional) before establishing the tunnel to network device 130.

Figure 3C:
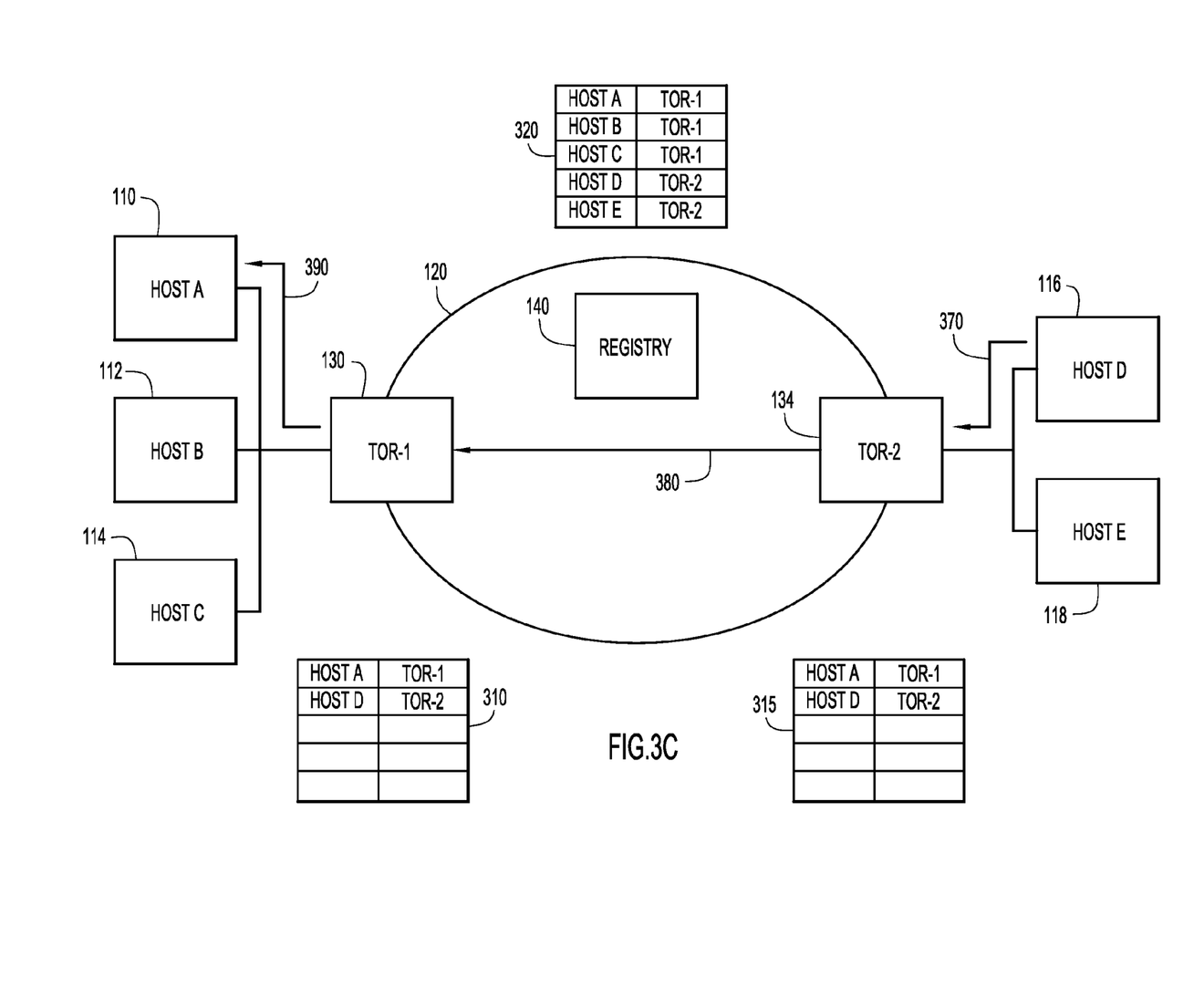

Referring now to FIG. 3C, a system diagram shows the location tables for the network devices as a host responds to an initial data packet. Host 116 sends a data packet 370 with a destination of host 110, e.g., in response to the data packet from host 110. The network device 134 receives the data packet 370 and looks up the reachability information for host 110 in location table 315 to determine where to send the data packet. The network device 134 sends the data packet to the network device 130 indicated in the location table 315 along with reachability information for host 116 in packet 380. The network device 130 stores the reachability information for host 116 in the location table 310, and forwards the data to the host 110 as data packet 390. The network device 130 may then set up a tunnel from network device 130 to the network device 134 in anticipation of further data packets between host 110 and host 116.

In one example, network devices 130 and 134 set up tunnels to each other as soon as each one receives a data packet with reachability information for the other. Alternatively, the network devices may determine if the communication is going to be bidirectional before setting up tunnels in both directions.

In another example, a tunnel from a network device may be used for communications between multiple host devices behind the network device. In other words, if host 110 and host 112 both have communication sessions with host 116, then the communication sessions may use the same tunnels. Since the reachability information for hosts 110 and 112 will indicate that both are behind network device 130, the tunnels to/from network device 134 may be used for both communication sessions.

Figure 4:
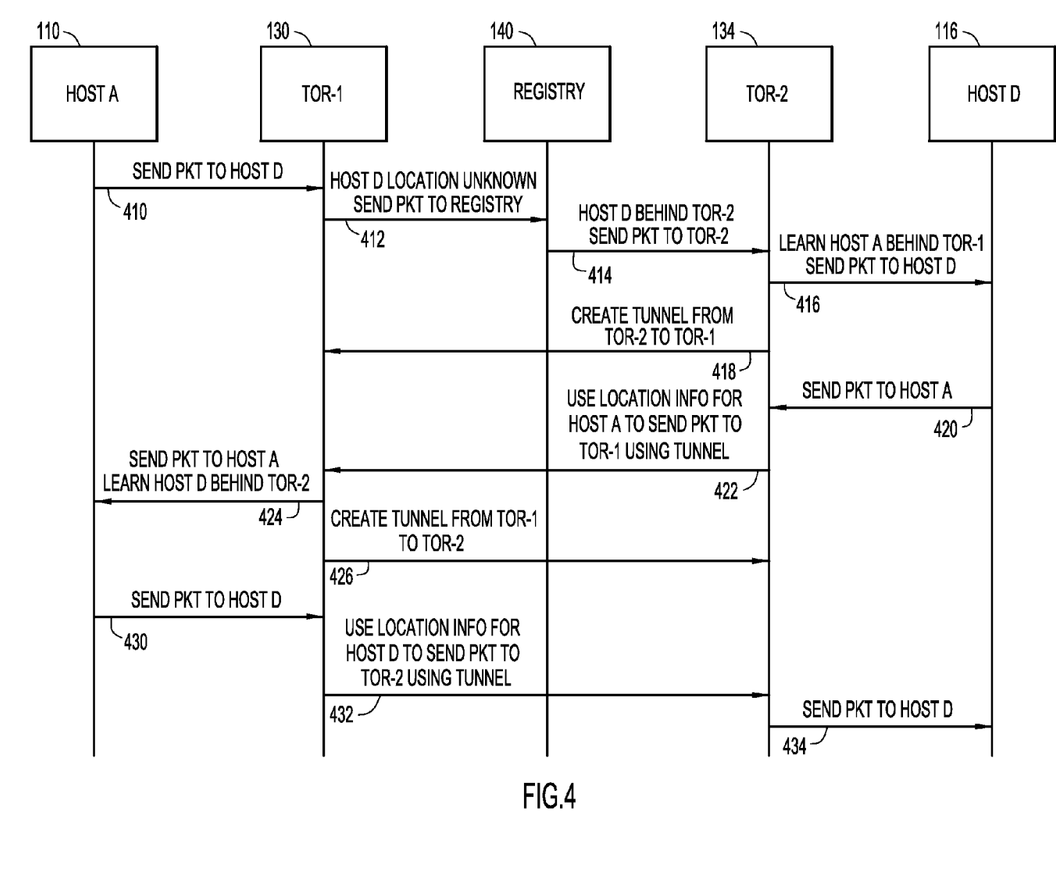
FIG. 4 is a ladder diagram showing steps of creating tunnels between network devices, according to an example embodiment.

Referring now to FIG. 4, a ladder diagram shows an example of messages passed between host 110 and host 116 according to an example embodiment. Initially, host 110 (host A) sends a data packet 410 toward the data center network with a destination of host 116 (host D). Network device 130 (TOR-1) receives the data packet 410 and determines that the network device 130 does not have reachability information for host 116. The network device 130 sends the data packet 412 to the registry device 140 for the registry device to forward toward host device 116. The registry device 140 determines that the host 116 is located behind network device 134 (TOR-2), and sends the data packet 414 to the network device 134.

The network device 134 receives the data packet 414, and forwards the data packet 416 to the host 116. The data packet 414 also includes reachability information for host 110, which the network device 134 stores in a location table. The network device 134 uses the reachability information of host 110 to create a tunnel 418 to the network device 130.

In response to the packet from host 110, the host 116 sends data packet 420 toward the data center network via network device 134 with a destination of host 110. The network device 134 receives the data packet 420 and sends the packet 422 to the network device 130 using the tunnel 418 created using the reachability information for host 110. The network device 134 also includes reachability information for host 116 in the data packet 422. The network device 130 receives the data packet 422, stores the reachability information for host 116, and forwards the data packet 424 to the host 110. The network device 130 also creates a tunnel 426 to the network device 134 using the reachability information received in the data packet 422.

The host 110 then sends a subsequent data packet 430 with a destination of host 116 to the network device 130. The network device 130 now has location information for host 116, and sends the data packet 432 along the tunnel 426 that was created using the reachability information in data packet 422. At the end of the tunnel, the network device 134 forwards the data packet 434 to the host 116. Since network devices 130 and 134 have reachability information for hosts 110 and 116, and tunnels have been set up in both directions, subsequent data packets between the hosts 110 and 116 are routed directly through the tunnels.

In one example, the tunnels between any two network devices may be brought down based on an aging mechanism. If traffic has not been directed toward a particular host for a predetermined amount of time, then the tunnel toward that host may be removed.

Figure 5:
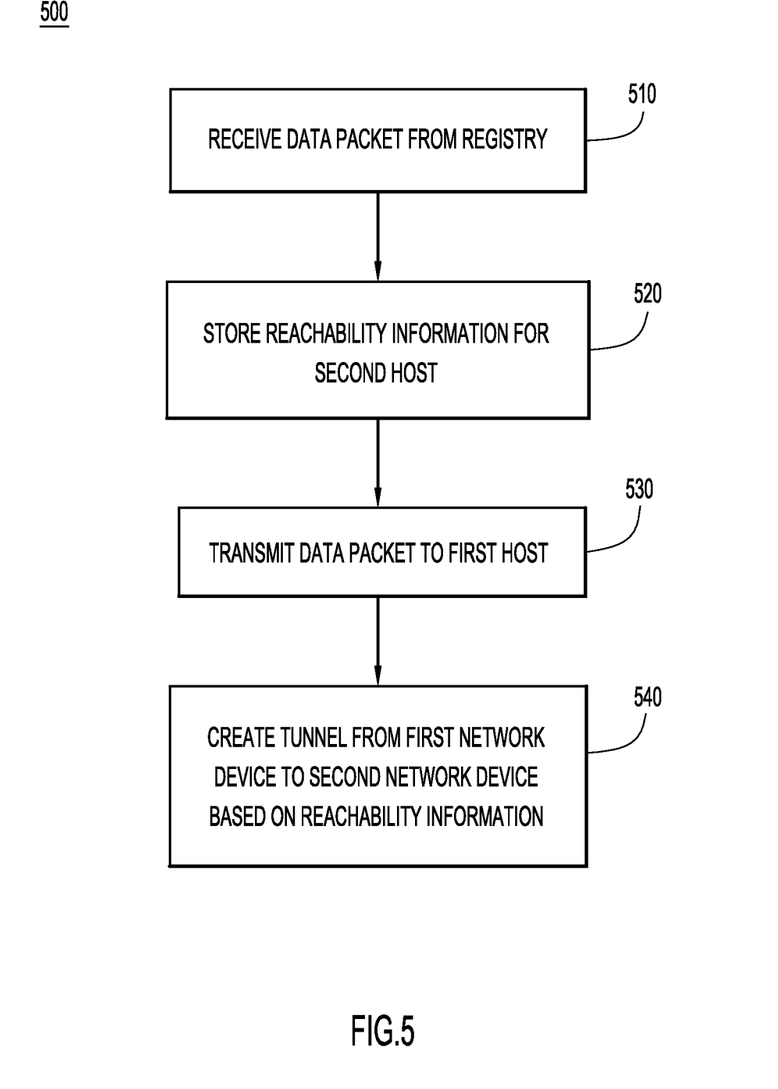
FIG. 5 is a flowchart showing the operations of a network device learning the location of a host and creating a tunnel to the corresponding network device, according to an example embodiment.

Referring now to FIG. 5, a flow diagram shows a process 500 in which a first network device (e.g., network device 134) creates a tunnel to a second network device (e.g., network device 130) based on reachability information received from the registry device. In step 510, the first network device receives a data packet from a registry device. The data packet from the registry device includes data directed toward a first host from a second host. The data packet from the registry also includes reachability information for the second host, which is stored in the first network device at step 520. In one example, the reachability information for the second host may be inserted either at the second network device or at the registry device. In step 530, the first network device transmits the data packet to the second host, i.e., the destination host. Using the stored reachability information for the second host, the first network device creates a tunnel from the first network device to the second network device at step 540.

Figure 6:
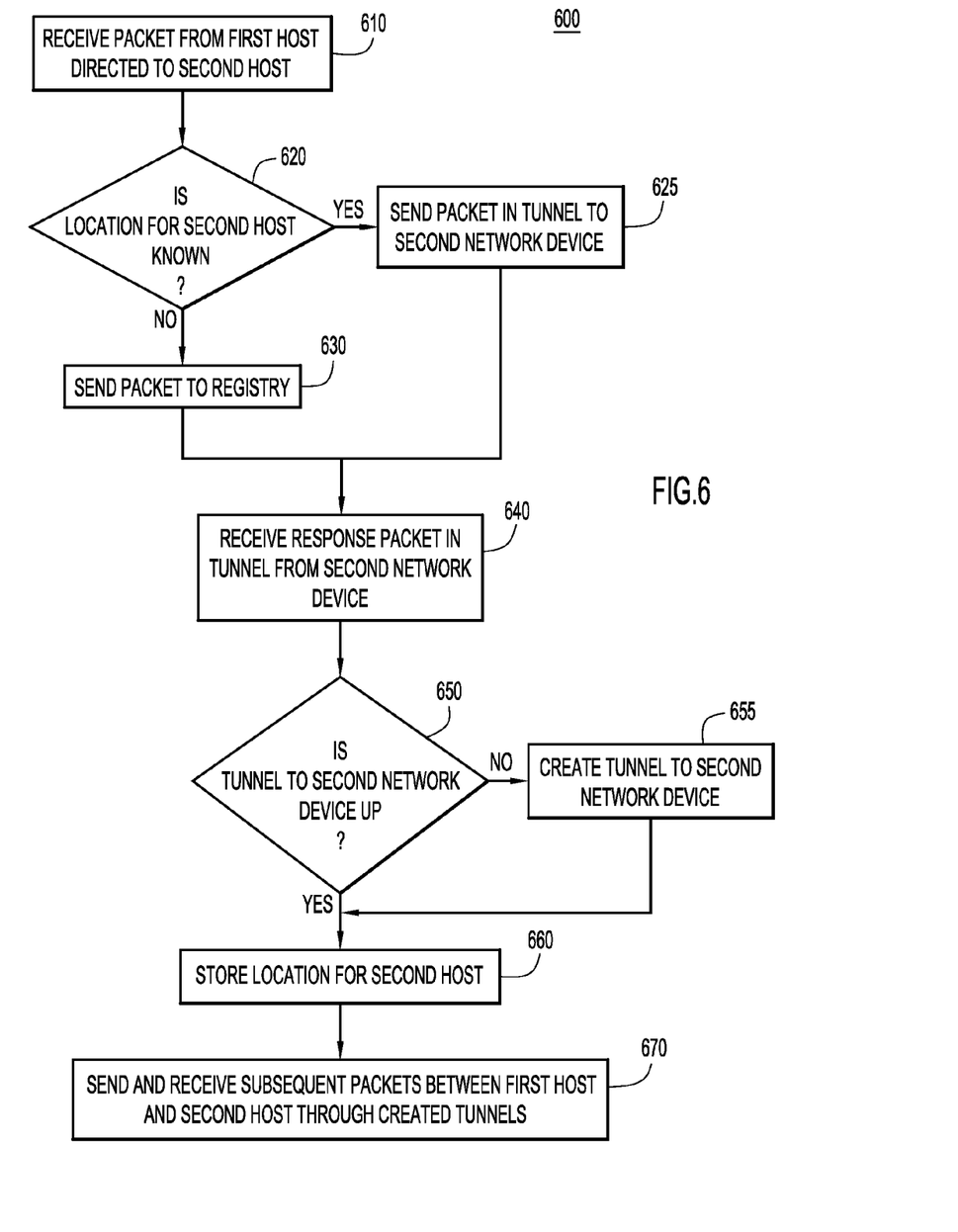
FIG. 6 is a flowchart showing the operations of a network device setting up a tunnel for a host that is coupled to the network device, according to an example embodiment.

Referring now to FIG. 6, a flow diagram is shown of a process 600 in which a first network device (e.g., network device 130) sets up a communication session between a first host (e.g., host 110) and a second host (e.g., host 116) behind a second network device (e.g., network device 134). In step 610, the first network device receives a data packet from the first host directed to the second host. If the location/reachability information for the second host is known, as determined in step 620, then the first network device sends the data packet to the second network device through a tunnel using the known reachability information in step 625. If the location for the second host is unknown, then the first network device sends the packet to the registry device in step 630, to be forwarded to the second host via the corresponding second network device. In step 640, the first network device receives a packet destined for the first host in a tunnel from the second network device.

The data packet received in the tunnel from the second network device includes reachability information for the second host. If there is not already a tunnel set up to the second network device, as determined in step 650, then a tunnel from the first network device to the second network device is created in step 655 using the reachability information for the second host. After the tunnel to the second network device is established, or if the tunnel was previously established, the location/reachability information for the second host is stored in step 660. In step 670, the first network device sends and receives subsequent packets between the first host and the second host through the created tunnels without needing to route the packets through the registry.

In summary, a data center with an efficient, conversation-based, dynamic overlay-tunnel management system is provided. The management of tunnels between servers/hosts as presented herein reduces waste of hardware/software tunnel management resources, enabling efficient scaling of overlay-tunnel management in large scale data centers.

In one form, a computer-implemented method performed at a first network device is provided, the method comprising receiving a first data packet from a registry device. The first data packet includes a destination of a first host coupled to the first network device and reachability information for a second host coupled to a second network device. The method further comprises storing the reachability information for the second host, which indicates that the second host is coupled to the second network device. The first network device transmits the first data packet without the reachability information to the first host. Using the reachability information for the second host, a tunnel is created from the first network device to the second network device.

In another form, an apparatus is provided comprising a network interface unit, a memory and a processor. The network interface unit is configured to send and receive communications over a network. The processor is coupled to the memory and configured to receive a first data packet via the network interface unit from a registry device. The first data packet includes a destination of a first host coupled to the first network device and reachability information for a second host coupled to a second network device. The processor is configured to store the reachability information for the second host in the memory, indicating that the second host is coupled to the second network device. The processor is further configured to transmit, via the network interface unit, the first data packet without the reachability information to the first host. The processor is configured to create a first tunnel from the first network device to the second network device using the reachability information for the second host.

In yet another form, a system is provided comprising a first network device, a registry device, and a second network device. The first network device is coupled to a first host among a plurality of hosts, and is configured to receive a first data packet directed toward a second host among the plurality of hosts. The first network device determines whether it has stored reachability information for the second host. Responsive to a determination that the first network device has not stored reachability information for the second host, the first network device transmits the first data packet to the registry device. The registry device is configured to store reachability information for the plurality of hosts, and receives the first data packet from the first network device. The registry device determines reachability information for the second host and transmits the first data packet to the second network device coupled to the second host based on the determined reachability information for the second host. The registry device also transmits reachability information for the first host to the second network device. The second network device is configured to receive the first data packet and reachability information for the first host from the registry device. The second network device stores the reachability information for the first host, transmits the first data packet to the second host, and creates a tunnel from the second network device to the first network device using the reachability information for the first host.

In a further form, a computer-implemented method performed at a source network device is provided, the method comprising receiving a first data packet for a destination host from a source host among a plurality of hosts. The source network device determines whether it has stored reachability information for the destination host. Responsive to a determination that the source network device has not stored reachability information for the destination host, the source network device transmits the first data packet to a registry device configured to store reachability information for the plurality of hosts. In a tunnel from a destination network device, the source network device receives a second data packet and reachability information for the destination host of the first data packet. The source network device stores the reachability information for the destination host and creates a tunnel to the destination network device for subsequent data packets to the destination host.

The above description is intended by way of example only. Various modifications and structural changes may be made therein without departing from the scope of the concepts described herein and within the scope and range of equivalents of the claims.

What is claimed is:

1. A method comprising:
   at a first network device, receiving a first data packet from a registry device, the first data packet including a destination of a first host coupled to the first network device, and the first data packet also including reachability information for a second host coupled to a second network device, wherein the reachability information for the second host indicates that the second host is coupled to the second network device;
   removing, from the first data packet, the reachability information for the second host;
   storing the reachability information for the second host;
   transmitting the first data packet to the first host without the reachability information for the second host;
   creating a first tunnel from the first network device to the second network device using the reachability information for the second host;
   receiving a second data packet from the first host, the second data packet directed toward the second host; and
   transmitting the second data packet and reachability information for the first host through the first tunnel, wherein the reachability information for the first host indicates that the first host is coupled to the first network device.

2. The method of claim 1, further comprising:
   receiving at least one subsequent data packet from the second network device through a second tunnel created from the second network device to the first network device using the reachability information for the first host; and
   transmitting the at least one subsequent data packet to the first host.

3. The method of claim 2, further comprising removing the first tunnel responsive to receiving no additional data packets through the second tunnel for a predetermined amount of time.

4. The method of claim 1, wherein storing the reachability information for the second host comprises storing a network address of the second network device.

5. The method of claim 1, wherein the registry device stores reachability information for a plurality of hosts including the first host and the second host.

6. The method of claim 5, wherein the reachability information for the second host is inserted into the first data packet at the registry device.

7. The method of claim 1, wherein the reachability information for the second host is inserted into the first data packet at the second network device.

8. An apparatus comprising:
   a network interface unit configured to send and receive communications over a network;
   a memory; and
   a processor coupled to the network interface unit and the memory, the processor configured to:
     receive a first data packet, via the network interface unit, from a registry device, the first data packet including a destination of a first host coupled to the apparatus, and the first data packet also including reachability information for a second host coupled to a network device, wherein the reachability information for the second host indicates that the second host is coupled to the second network device;
     remove, from the first data packet, the reachability information for the second host;
     store, in the memory, the reachability information for the second host;
     transmit, via the network interface unit, to the first host the first data packet without the reachability information;
     create a first tunnel from the apparatus to the network device using the reachability information for the second host;
     receive a second data packet, via the network interface unit, from the first host, the second data packet directed toward the second host; and
     transmit, via the network interface unit, the second data packet and reachability information for the first host through the first tunnel, wherein the reachability information for the first host indicates that the first host is coupled to the apparatus.

9. The apparatus of claim 8, wherein the processor is further configured to:
   receive, via the network interface unit, at least one subsequent data packet from the network device through a second tunnel created from the network device to the apparatus using the reachability information for the first host; and
   transmit the at least one subsequent data packet to the first host via the network interface unit.

10. The apparatus of claim 9, wherein the processor is further configured to remove the first tunnel responsive to receiving no additional data packets through the second tunnel for a predetermined amount of time.

11. The apparatus of claim 8, wherein the reachability information for the first host and the second host comprises network addresses of the apparatus and the network device.

12. The apparatus of claim 8, wherein the reachability information for the second host is inserted into the first data packet at the registry device.

13. The apparatus of claim 8, wherein the reachability information for the second host is inserted into the first data packet at the network device.

14. A system comprising:
   a first network device coupled to a first host among a plurality of hosts, the first network device configured to:
     receive a first data packet directed toward a second host among the plurality of hosts;
     determine whether the first network device has stored reachability information for the second host; and
     responsive to a determination that the first network device has not stored reachability information for the second host, transmit the first data packet to a registry device configured to store reachability information for the plurality of hosts;

the registry device configured to:
  receive the first data packet from the first network device;
  determine reachability information for the second host; and
  transmit a second data packet including the first data packet and reachability information for the first host to a second network device coupled to the second host based on the determined reachability information for the second host, wherein the reachability information for the first host indicates that the first host is coupled to the first network device;

the second network device coupled to the second host, the second network device configured to:
  receive the second data packet including the first data packet and the reachability information for the first host from the registry device;
  remove from the second data packet the reachability information for the first host;
  store the reachability information for the first host;
  transmit the first data packet to the second host without reachability information for the first host;
  create a first tunnel from the second network device to the first network device using the reachability information for the first host;
  receive a third data packet from the second host, the third data packet directed toward the first host; and
  transmit the third data packet and reachability information for the second host through the first tunnel.

15. The system of claim 14, wherein the first network device is further configured to:
  receive the reachability information for the second host through the first tunnel; and
  create a second tunnel from the first network device to the second network device using the reachability information for the second host.

16. The system of claim 15, wherein the second network device is further configured to remove the first tunnel responsive to receiving no additional data packets through the second tunnel for a predetermined amount of time.

17. The system of claim 15, wherein the first network device is further configured to remove the second tunnel responsive to receiving no additional data packets through the first tunnel for a predetermined amount of time.

18. The system of claim 14, wherein the first network device is further configured to:
  receive at least one subsequent data packet from the first host directed toward the second host; and
  transmit the at least one subsequent data packet through the second tunnel.

19. The system of claim 14, wherein the registry device is configured to store the reachability information for the plurality of hosts by storing network addresses of corresponding network devices that are coupled to one or more of the plurality of hosts.

20. The system of claim 14, wherein the registry device is configured to insert the reachability information for the first host into the first data packet to generate the second data packet.

* * * * *